Dec. 31, 1935.  J. BLACKBURN  2,025,717

CABLE BRACKET AND FASTENING

Filed Dec. 13, 1933

INVENTOR
JASPER BLACKBURN
By Adam E. Fisher
ATTORNEY

Patented Dec. 31, 1935

2,025,717

UNITED STATES PATENT OFFICE 2,025,717

CABLE BRACKET AND FASTENING

Jasper Blackburn, Webster Groves, Mo.

Application December 13, 1933, Serial No. 702,168

3 Claims. (Cl. 248—66)

This invention relates to cable supporting brackets and fastenings, for securing wire cables or the like to posts, as in the erection of highway guards or any similar structure.

In such work it is common to erect a line of posts along the side of the road-way, and then to stretch a line of wire cable along these posts and finally to secure the cable to the posts by some form of fastening.

In view of the fact that when an automobile or other vehicle strikes such highway guard it usually does so at such an acute angle that the vehicle is caused to slide or glide along the cable for a substantial distance, and for a space including one or more posts, it is desirable that the cable supports and fastenings used be of a design to support the cable in an out-thrust relation to the posts, so that the hubs or other laterally protruding parts of the vehicle will not strike against the posts directly, but will slide past the same. It is also desirable that the cable be left free to move longitudinally thru its supports and fastenings, both in order that it may be stretched or tightened from time to time, as it becomes too much loosened, and also to afford the needed resiliency inherent in a comparatively long stretch of cable, so that the impact of a vehicle striking the same may be more gradually absorbed and dissipated. It is also desirable that the cable fastening itself be of such design as to permit the ready and quick attachment or removal of the cable to or from any individual post.

It is therefore the purpose of the present invention to provide in a relatively simple and practical form a combined cable bracket and fastening which will effectually meet the aforesaid requirements.

With the foregoing and such other objects and advantages in view as may appear from the following specification and the accompanying drawing, attention is now directed to the said drawing as exemplifying a preferred embodiment of the invention, and wherein.

Figure 1:
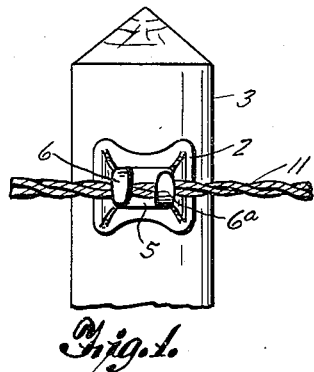
Figure 1 is an elevation of the upper end of a post, with a conventional wire cable anchored thereto by means of one form of my improved bracket and fastening.
Figure 2:
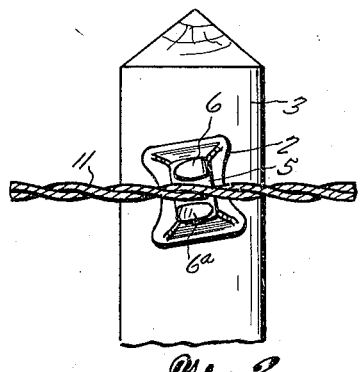
Figure 2 is a view similar to that of Figure 1, the cable supporting bracket being shown as rotated ninety degrees, for the purpose of engaging the cable by the fastening carried at the end of the bracket.

In the forms shown in Figures 1 to 5 inclusive, the invention comprises an open, bracket-like structure 1, which includes a base plate 2 adapted for positioning at one side of a post 3, and two spaced legs 4 connected by a hook-plate 5, the latter supporting a pair of laterally spaced and reversely turned and positioned cable engaging hooks or hook-lugs 6—6a. The plate 2 is formed with a medial, inturned boss 2a and a bolt hole 7 is formed thru this plate and boss. This plate may be also provided with post engaging spurs 8, if desired. This bracket is secured to the post by means of a bolt 9 passed directly thru the post and thru the bolt hole 7 of the plate 2, the nut 10 being then turned up. It is obvious of course that the bolt 9 might be reversed if desired and the nut 10 positioned at the outer or opposite side of the post. Or, the walls of the bolt-hole 7 may be threaded as shown at 7a in Figure 5, for engaging the threaded end of the bolt, and the nut 10 be dispensed with, the bolt being tightened by turning the squared head 9a. The hook-lugs 6—6a are spaced apart sufficiently to permit the cable 11 to be inserted between them, as shown in Figure 2, and they stand out from the plate 5 sufficiently to permit the cable to slide freely thru behind them after it is inserted.

Figure 3:
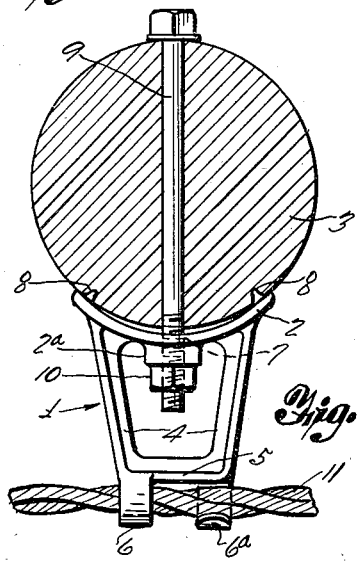
Figure 3 is a horizontal section on an enlarged scale thru one of the posts, such as represented in Figure 1, taken at the point of attachment of the bracket, the latter being shown in plan and the engaged cable and securing bolt being shown in full lines.
Figure 4:
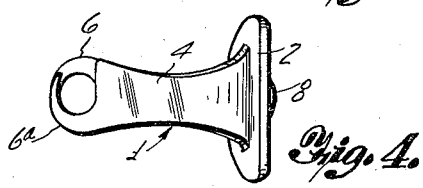
Figure 4 is a side elevation of the form of bracket represented in Figures 1, 2 and 3, drawn to the scale of Figure 3.
Figure 5:
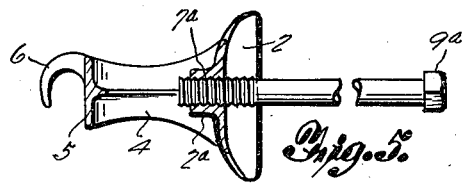
Figure 5 is a longitudinal section thru the bracket substantially as represented in Figure 3, with the addition of the securing bolt which is shown in full lines, a medial portion of the bolt being broken out.

In use the supporting bracket and fastening as described is mounted on the side of the post by means of the bolt, in manner pointed out. For the purpose of engaging the cable 11 the nut 10 is loosened sufficiently to enable the bracket 1 to be rotated ninety degrees, as represented in Figure 2, or so that the stretched cable may be passed in between the hook-lugs 6—6a, after which the bracket is turned back to its normal position with the planes of the hooks directed vertically. The nut 10 or bolt head 9a is then turned, to tighten the assembly to the post. Thus it will be seen that the two hook-lugs 6—6a completely but loosely embrace the cable, one at each side thereof, and so as to effectually prevent its removal or escape so long as the bracket remains in its said normal or locking position, as shown in Figures 1 and 3. At the same time the hook-lugs do not grip the cable, but the latter is free to move longitudinally, and may be stretched for quite a distance or as desired.

Figure 6:
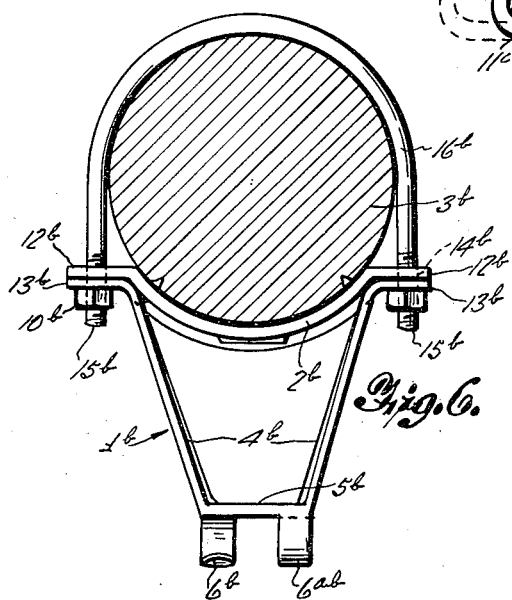
Figure 6 is a plan view of a yoke assembly as means for securing the cable supporting bracket to the post, in lieu of the bolt represented in Figure 3.

In the assembly represented in Figure 6 the base plate 2b is free and separated from the balance of the bracket structure, and is formed with out-turned ears 12b to meet the aligned feet 13b of the legs 4b. Aligned bolt holes 14b are pierced thru the said ears and feet to engage the threaded ends 15b of the U-shaped loop or yoke 16b which is passed around the opposite side of the post 3b. Nuts 10b are turned up on the ends 15b for locking the assembly to the post. In the use of this assembly the bracket 1b may be freed from the balance of the assembly, so that it may be turned for passing the cable between and within the hook-lugs 6b—6ab, in manner pointed out for the structure shown in Figures 1 to 5, after which the bracket may be righted and drawn tight to the post thru the operation of the nuts 10b upon the threaded yoke-ends 15b. As a matter of course, if the cable is loose and not stretched between posts, the cable itself may be turned for insertion between and within the hook-lugs of either of the two brackets 1 or 1b, and while they remain normally positioned upon and bolted tightly to their posts. By virtue of the three-part assembly here provided, and by making the several elements of the assembly of suitably pliable or bendable material such as malleable iron or the like, they may be bent or rebent, or shaped or reshaped at will to conform to any peculiar or unusual situation that may arise in the erection of highway guards, and so as to fit any oddly shaped post or tree used in lieu of post, or to fit a relatively larger or smaller post or tree. This adaptation would be accomplished by bending the yoke 16b, the base plate 2b and the legs 4b as might be required in any particular exigency. This could not be accomplished except for the individual formation of the three parts. Moreover, because of the three part structure provided, the yoke and base plate may be used alone to form a cincture to mend or support a split post, the bracket element being then discarded.

Figure 7:
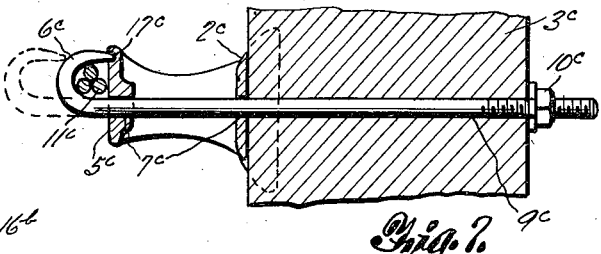
Figure 7 is a view on the scale of Figure 3, of a modification showing a vertical section thru a section of a post, upon which is mounted a modified form of cable supporting bracket and fastening, the cable hook and bolt constituting the modification being shown in full lines, the cable supported thereby being shown in section.
Figure 8:
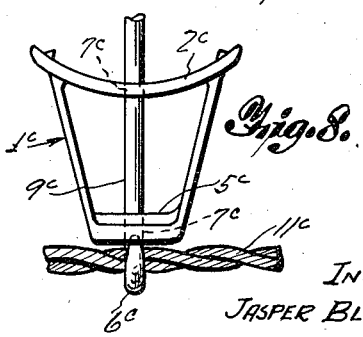
Figure 8 is a plan view of the bracket and hook-bolt and cable as represented in Figure 7, the threaded end of the bolt being broken off.

In the modification shown in Figures 7 and 8, the bracket 1c is integrally formed, similarly to the bracket 1 of Figures 1 to 5. Aligned bolt holes 7c are formed thru both the base plate 2c and the outer plate 5c. A hook-bolt 9c is then passed thru these holes and thru the post 3c, similarly to the assembly of Figure 3. The outer or forward end of this bolt is formed as a single hook or hook-lug 6c for engaging the cable 11c, the nose of the hook being adapted to be engaged by the socket 17c formed in the plate 5c as the hook is moved to the plate. In the use of this assembly the hook-bolt 9c is loosened, and the hook 9c is pulled out, as shown in dotted lines in Figure 7, so as to admit the cable 11c within the hook, after which the hook-bolt is forced back to the position shown in Figures 7 and 8, and the nut 10c is turned up, thus drawing the nose of the hook into the socket 17c and effectually securing the cable in place.

Figure 9:
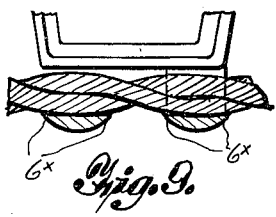
Figure 9 is a detail showing the lateral margins of the hook-lugs as bevelled off to meet the cable, to facilitate the sliding thereover of the contacting part of a vehicle.

In order to facilitate the slippage of a vehicle along the cable, the lateral margins of the hook-lugs 6, 6a, 6ab, 6c may be feathered or beveled to meet the cable, as shown at 6x in Figure 9. Such arrangement would prevent the contacting part of a vehicle from striking upon the otherwise abrupt margins of the lugs, which might enhance the chances of damage. Such beveled marginal structure therefore co-operates with the out-thrust location or placement of the hook-lugs thru which the cable passes, for minimizing damage to a vehicle. Therefore the out-thrust location or placement of the hook-lugs for engaging the cable, the marginal beveling of the same to meet the cable and the longitudinal freedom of movement allowed the cable by the described forms of fastening, all conduce to and co-operate for minimizing the chances of damage to vehicles which may strike the cable.

While the base plates 2, 2b, 2c are represented in the drawing as curved to conform to the round posts shown, it is obvious that the same may be made flat to conform to square posts, and while I have herein shown and described certain embodiments of my invention, and have pointed out certain structural details thereof, it is understood that I am not to be limited or confined to the exact showing here made, but that I may vary any of the structural features in minor details so as to best adapt the invention to practical use, not departing however from the spirit of the invention, as defined in the appended claims.

I claim:

1. In a device of the kind described, an elongated base plate including a medial out-bent portion formed and dimensioned to partially and snugly embrace a post when transversely positioned at one side thereof and including apertured ears extended outwardly in transverse alignment at its ends, whereby as positioned upon the post the said ears would stand inset from the face thereof, a bracket for positioning upon the base plate, the same having apertured feet spaced apart for clearing the out-bent portion of the base plate and adapted to seat upon the ears of the base plate with the apertures of the ears and feet in registry, a pair of laterally spaced and reversely turned hook-lugs extended from the predetermined outer part of the bracket as positioned on the post, the lugs being arranged to pass a cable between and within them, a U-shaped yoke formed and dimensioned to snugly embrance the post from the opposite side thereof, the ends of the yoke being threaded and formed to pass thru the said registered apertures of the ears and feet of base plate and bracket and nuts for engaging the protruded threaded ends of the yoke as means for securing the elements together and to the post upon which the device is mounted.

2. In a device of the kind described, an elongated base plate having aperatures at its extremities, a bracket for positioning upon the base plate the same being formed with legs spaced apart and with apertured feet at the extremities of the legs adapted to seat upon the extremities of the base plate with the respective apertures in registry, means at the outer part of the bracket for engaging a cable, and a yoke having its ends threaded formed and turned to pass thru the said registered apertures, and nuts for engaging the threaded ends of the yoke as means for securing the elements together.

3. In a device of the kind described, an elongated base plate including a medial out-bent portion designed to partially embrace a post and including apertured ears at its extremities extended outwardly in transverse alignment, a bracket for positioning upon the base plate the same having spaced legs for clearing the outbent portion of the base plate and apertured feet adapted to seat upon the ears of the base plate with the apertures of the ears and feet in registry, means at the outer part of the bracket for releasably engaging a cable, and a yoke formed and dimensioned to embrace the post from the opposite side thereof, the ends of the yoke being turned, threaded and formed to pass thru the said registered apertures of the ears and feet of base plate and bracket, and nuts for engaging the protruded threaded ends of the yoke as means for securing the elements together and to the post upon which the device is mounted, the several elements of the device being constructed of suitably pliant material to enable their reshaping for fitting snugly upon a relatively larger or smaller post.

JASPER BLACKBURN.